United States Patent Office 3,152,166
Patented Oct. 6, 1964

3,152,166
UNSATURATED ESTERS OF BORONIC ACIDS
Phillip G. Abend, Chicago, Ill., assignor to Gulf Research & Development Company, Pittsburgh, Pa., a corporation of Delaware
No Drawing. Filed July 19, 1960, Ser. No. 43,713
7 Claims. (Cl. 260—462)

This invention relates to new chemical compounds and more particularly to certain unsaturated esters of boronic acids having utility as improvement agents in hydrocarbon lubricating oils and as intermediates in the synthesis of oil-soluble copolymers that are useful to improve one or more properties of various hydrocarbon oils.

The chemical compounds included by the present invention include unsaturated esters of either phenylboronic acids or an alkylboronic acid whose alkyl groups contain 8 to 18 carbon atoms and whose ester substituents are each hydrocarbon radicals containing a single olefinic linkage and 2 to 8 carbon atoms. A specific example of a preferred unsaturated ester is diallyl nonylboronate. Another specific example of another compound included by the invention is diallyl phenylboronate. Examples of other such compounds are divinyl nonylboronate, di(2-methyl-3-buten-2-yl)nonylboronate, 2-styryl nonylboronate, divinyl octadecylboronate and dicrotyl dodecylboronate.

The compounds of this invention can be prepared in any convenient way. For example, they can be prepared by direct esterification of the selected phenylboronic acid or alkylboronic acid with at least an equivalent proportion of the selected, unsaturated, monohydric alcohol. No catalyst is ordinarily necessary, but a small amount of an esterification catalyst such as sulfuric acid, p-toluene sulfuric acid, dry hydrogen chloride, or the like can be used if desired. To accelerate the reaction and to drive the reaction to completion, it is normally preferable to heat the reaction mixture with refluxing at least to the boiling point of water, or to the boiling point of a low-boiling azeotropic mixture of water and an azeotroping agent such as benzene, toluene, or the like, and with trapping of water of esterification so as to remove this product from the reaction mixture. The reaction will be complete when no more water is distilled over from the reaction mixture. Alternatively, the selected phenylboronic acid or alkylboronic acid can be reacted with an unsaturated hydrocarbon containing an acetylenic linkage in equivalent proportions. As a further alternative the desired boronic acid esters can be prepared by reacting equimolar proportions of a Grignard reagent, RMgX, where R is a phenyl group or an alkyl group containing 8 to 18 carbon atoms, with a triester of boric acid and an unsaturated alcohol containing 2 to 8 carbon atoms. Still another method of preparing the herein disclosed unsaturated boronic acid esters involves direct esterification of an alkylene chlorohydrin with the selected phenylboronic acid or alkylboronic acid in at least equivalent proportions with respect to the boronic acid, followed by dehydrochlorination of the esterified product with a strong base.

When the unsaturated boronic acid esters of this invention are prepared by direct esterification, as will usually be the case, they can be derived from unsaturated reactants such as allyl, isopropenyl, methallyl or crotyl alcohols, or phenylacetaldehyde, and from boronic acids such as octyl-, nonyl-, decyl-, lauryl-, octadecyl-, and phenylboronic acid. When the esters of this invention are prepared by esterification of a boronic acid with an alkylene chlorohydrin and dehydrochlorination of the product, materials such as ethylene chlorohydrin, propylene chlorohydrin, and butylene chlorohydrin can be substituted for the unsaturated monohydric alcohols disclosed above. When the esters are prepared by reaction of a Grignard reagent with a boric acid triester, materials such as n-octyl, 2-ethylhexyl, lauryl and octadecyl magnesium chloride or bromide and triallyl, triisopropenyl, tricrotyl, and tristyryl borates can be used.

Boronic acid esters included by the present invention can be represented by the formula: $RB(OR')_2$, where R is phenyl or a straight- or branched-chain alkyl radical containing 8 to 18 carbon atoms and the R' substituents are like or unlike hydrocarbon radicals, each containing a single olefinic linkage in an aliphatic chain and 2 to 8 carbon atoms. The aliphatic chains of these hydrocarbon radicals can be straight- or branched-chain, and the radicals will normally be monovalent, but both R' substituents together can be a single divalent hydrocarbon radical such as a dimethylene or isopropylene radical. Specific examples of suitable R' substituents include vinyl, allyl, isopropenyl, crotyl, 2-methyl-3-buten-2-yl and styryl. Specific examples of suitable R-substituents are n-octyl, 2-ethylhexyl, oxo-octyl, n-decyl, lauryl, oxo-tridecyl, n-tetradecyl and octadecyl. When R is phenyl it can be substituted with one or more low formula-weight hydrocarbon substituents such as methyl or isobutyl in the ortho, meta, and/or para positions.

The combination in a single molecule of the 8 to 18 carbon atom alkylboronyl or phenylboronyl groups and the two unsaturated ester substituents is very important for the purposes of the present invention. It has been found that this particular combination results in a material having unusual detergency-improving properties in hydrocarbon lubricating oils. The combination also results in a monomeric material that is especially suitable as an intermediate in the preparation of oil-soluble copolymers with monomeric oil-soluble esters of polymerizable, ethylenically unsaturated acids, of which lauryl acrylate and lauryl methacrylate are typical examples. The presence of at least two, but no more than two olefinic linkages in the molecule is important for the purposes of this invention in that cross-linking is possible in an amount sufficient to provide copolymers of sufficient molecular size to impart the desired improvement in viscosity index and other properties to the hydrocarbon oils to which they are added, yet insufficient to result in formation of oil-insoluble copolymers. The two olefinic linkages in the unsaturated esters may also contribute chemically to any increased oil stability obtained therewith.

The invention may be more fully understood by reference to the following specific embodiments:

EXAMPLE I

A mixture of 0.2 mole normal boronic acid, 0.74 mole allyl alcohol and 150 ml. benzene is refluxed in a round-bottom flask connected to a reflux condenser by means of a Dean-Stark trap, until 7.3 ml. water has been collected in the trap. The benzene is removed by atmospheric distillation. The product, diallyl nonylboronate, is obtained as a distillate by vacuum distillation. Yields of the product average 87 percent. A product prepared as described had the following properties:

Boiling point, ° C. (mm. Hg) _____ 74–77 (1.2)
Index of refraction, $n_D^{22}$ _____ 1.4408
Elemental analysis:
  Carbon, percent by wt.—
    Calculated for
      $(CH_2{=}CHCH_2O)_2BC_9H_{19}$ ____ 70.81
    Found _____ 70.51
  Hydrogen, percent by wt.—
    Calculated for
      $(CH_2{=}CHCH_2O)_2BC_9H_{19}$ ____ 11.42
    Found _____ 10.92
  Boron, percent by wt.—
    Calculated for
      $(CH_2{=}CHCH_2O)_2BC_9H_{19}$ ____ 4.36
    Found _____ 4.20

EXAMPLE II

In this synthesis triphenylboroxine is employed as a starting material. Triphenylboroxine is a six-membered ring in which three boron atoms alternate with three oxygen atoms. Each boron atom is linked to a phenyl group. Thus, triphenylboroxine can be regarded as a cyclic anhydride of phenylboronic acid. In a specific preparation, a mixture of 0.034 mole triphenylboroxine, 0.34 mole allyl alcohol and 150 ml. toluene is refluxed until 3 ml. of toluene-insoluble material is collected in the Dean-Stark trap referred to in Example I. The remaining toluene is removed from the reaction mixture by flash evaporation and the residue is vacuum distilled to provide a good yield of diallyl phenylboronate. A product prepared as described above was found to have the following properties:

Boiling point, °C. (mm. Hg) _____ 67–69 (0.7)
Index of refraction, $n_D^{22}$ _____ 1.5011
Elemental analysis:
  Carbon, percent by wt.—
    Calculated for
      $(CH_2{=}CHCH_2O)_2BC_6H_5$ _____ 71.25
    Found _____ 69.68
  Hydrogen, percent by wt.—
    Calculated for
      $(CH_2{=}CHCH_2O)_2BC_6H_5$ _____ 7.43
    Found _____ 7.47
  Boron, percent by wt.—
    Calculated for
      $(CH_2{=}CHCH_2O)_2BC_6H_5$ _____ 5.44
    Found _____ 5.34

EXAMPLE III

A mixture of 0.38 mole of 2-methyl-3-buten-2-ol, 0.1 mole of nonylboronic acid and 150 ml. toluene are refluxed in a Dean-Stark apparatus until 3.2 ml. water are collected as distillate in the trap. The reaction mixture is distilled to obtain a crude di(2-methyl-3-buten-2-yl) nonylboronate product boiling between 80 and 140° C. at 0.7 mm. Hg.

EXAMPLE IV (a) A mixture of 0.15 mole nonylboronic acid, 0.30 mole phenylacetylene, 5 grams of powdered potassium hydroxide, and 250 ml. of 1,4-dioxane are refluxed for five hours. The reaction mixture is filtered and the filtrate is distilled to recover a crude distyryl nonylboronate product boiling between 55 and 65° C. at 0.85 mm. Hg.

(b) In accordance with this preparation the potassium salt of nonylboronic acid is first formed by adding one gram of potassium metal to 0.15 mole of nonylboronic acid in 200 ml. of dry dioxane. Evolution of hydrogen gas accompanies formation of the potassium salt. A mixture of 0.3 mole of phenylacetylene in 100 ml. of dry dioxane is added to the mixture and the resulting mixture is refluxed for five hours. The dioxane is then removed by flash evaporation and the residue is vacuum distilled to obtain a crude distyryl nonylboronate product boiling between 60 and 70° C. at 0.8 mm. Hg.

EXAMPLE V (a) A mixture of 0.36 mole of allyl alcohol, 150 ml. toluene and 0.1 mole of ABA–18 are refluxed in a Dean-Stark apparatus. ABA–18 is a commercial or prototype commercial aliphatic boronic acid containing 18 carbon atoms in the aliphatic group and containing chiefly octadecylboronic acid. Refluxing is continued until 13 ml. toluene-insoluble material is collected in the trap. The balance of the toluene is removed from the reaction mixture by flash evaporation. The residue comprises a diallyl octadecylboronate product.

(b) A mixture of 0.1 mole octadecylboronic acid, 0.51 mole allyl alcohol and 150 ml. diisobutylene is refluxed until 31 ml. diisobutylene insoluble material is collected in the trap. Diisobutylene is removed by flash evaporation and the residue is vacuum distilled to provide a diallyl octadecylboronate distillate boiling at 190° C. at 2 mm. Hg.

EXAMPLE VI

Nonylboronic acid in the amount of 0.2 mole is refluxed with 0.5 mole of ethylene chlorohydrin and 150 ml. toluene in a Dean-Stark apparatus until 8.7 ml. water is distilled over. Toluene is removed from the di(2-chloroethyl nonylboronate) product by evaporation. One-tenth mole of the chloro ester product and 0.2 mole of sodium iodide in 208 ml. dry acetone are refluxed for 8½ hours. The acetone is removed by vacuum stripping and 200 ml. of benzene is added to the residue. Sodium iodide is removed by filtration and 0.3 mole of trimethylamine is added to the filtrate, which is then refluxed for two hours. Twelve grams of a solid is formed and removed by filtration. The filtrate is again refluxed for five hours and an additional seven grams of solid is removed by filtration. Solvent is removed from the filtrate by evaporation. The residue from the evaporation is vacuum distilled to provide 4.5 grams of a divinyl nonylboronate product boiling between 60 and 85° C. at 0.85 mm. Hg.

Other unsaturated boronic acid esters included by the present invention can be prepared in similar manner by substitution of other suitable materials as disclosed herein in the same or equivalent proportions in the foregoing specific embodiments.

The herein-disclosed boronic acid esters are useful when employed in hydrocarbon lubricating oils in an amount sufficient to improve the detergent characteristics of the oil. Some improvement can be obtained by the use of as little as 0.1 percent by weight of the unsaturated boronic acid esters of this invention. A marked improvement is usually obtained by the use of 0.25 percent by weight or more of the esters. The unsaturated boronic acid esters of this invention are preferably employed in amounts not exceeding about 2 percent by weight of the composition, as the detergent characteristics of hydrocarbon oils containing these esters quite surprisingly decline with the use of larger proportions. However, larger proportions, up to 10 percent or more by weight of the composition, can be used if desired with satisfactory results.

The detergency-improving characteristics of the unsaturated boronic acid esters of this invention have been demonstrated by testing under accelerated conditions lubricating oil samples containing representative members of the class of compounds disclosed herein. Thus, there were prepared and tested separate samples of an SAE 10W lubricating oil containing, respectively, 0.5 percent diallyl nonylboronate prepared essentially as described in Example I and diallyl phenylboronate prepared essentially as described in Example II. Each of the test samples was subjected to a bench scale test adapted to evaluate the high temperature detergency characteristics of the test sample. Briefly, in accordance with this test, the oil sample to be tested—previously preheated to a temperature of about 150° to 165° F. in a reservoir provided with a heating means and an oil splashing means comprising a number of stainless steel wires attached to a rotatable steel shaft—is splashed onto the surface of a prepolished and tared aluminum test panel heated to a temperature of 500° F. Air is introduced into the oil reservoir at the rate of 10 liters per hour for the eight hour test period. At the conclusion of the test, the panel is removed and allowed to drain and cool. After cooling the test panel is washed free from oil, dried, and reweighed. The increase in weight of the panel in milliliters is recorded. The results of the above-described tests are presented in the table below. In order to demonstrate the unique detergency-improving characteristics of the unsaturated boronic acid esters of this invention, there are also presented in the following table the results obtained with a test sample made up of the same base oil and containing the same proportion of a diallyl butylboronate, a typical unsaturated boronic acid ester other than the kind included by the present invention.

TABLE A

|  | Blank | 1 | 2 | 3 |
|---|---|---|---|---|
| Test Sample Make-up, Percent by Wt.: |  |  |  |  |
| SAE 10W Lubricating Oil Base | 100 | 99.5 | 99.5 | 99.5 |
| Additives, percent by Wt.— |  |  |  |  |
| Diallyl Nonylboronate |  | 0.5 |  |  |
| Diallyl Phenylboronate |  |  | 0.5 |  |
| Diallyl Butylboronate |  |  |  | 0.5 |
| Detergency Test: |  |  |  |  |
| Deposit Wt., mg | 137 | 9.5 | 2.7 | 132.4 |

From the results presented in the foregoing table, it will be seen that the unsaturated boronic acid esters of this invention possess unique detergency-improving properties in hydrocarbon lubricating oils, which properties are not typical of the class of boronic acid esters as a whole.

As previously indicated the unsaturated boronic acid esters of this invention possess the ability to form high molecular weight oil-soluble copolymers without such excessive cross-linking as to promote oil-insolubility. In a specific embodiment diallyl nonylboronate prepared as described in Example I is copolymerized with lauryl methacrylate in the weight proportions of 10:90, in the presence of about 0.2 percent by weight of alpha,alpha'-azodiisobutyronitrile as a polymerization catalyst at a temperature in the range of 70°–90° C. over a period of about five hours. Incorporation of approximately 3 percent by weight of the resulting copolymer in hydrocarbon lubricating oil forms a compounded lubricating oil having an increased viscosity index.

Numerous modifications and variations of the invention as herein set forth can be resorted to without departing from the spirit or scope of the invention. Accordingly, only such limitations should be imposed as are indicated in the claims appended hereto.

I claim:

1. An unsaturated ester of a member selected from the group consisting of phenylboronic acids and alkylboronic acids whose alkyl groups contain 8 to 18 carbon atoms, the ester substituents of which are each hydrocarbon radicals containing a single olefinic linkage and 2 to 8 carbon atoms.

2. An unsaturated ester of an alkylboronic acid whose alkyl groups contain 8 to 18 carbon atoms and whose ester substituents are each hydrocarbon radicals containing a single olefinic linkage and 2 to 8 carbon atoms.

3. Diallyl nonylboronate.
4. Di(2-methyl-3-buten-2-yl) nonylboronate.
5. Distyryl nonylboronate.
6. Diallyl octadecylboronate.
7. Diallyl phenylboronate.

References Cited in the file of this patent

UNITED STATES PATENTS

| 2,413,718 | Lincoln et al. | Jan. 7, 1947 |
| 2,720,449 | Arimoto | Oct. 11, 1955 |
| 2,862,952 | Groszos | Dec. 2, 1958 |